(12) United States Patent
Lee et al.

(10) Patent No.: US 9,390,478 B2
(45) Date of Patent: Jul. 12, 2016

(54) REAL TIME SKIN SMOOTHING IMAGE ENHANCEMENT FILTER

(71) Applicant: Intel Corporation, Santa Clara, CA (US)

(72) Inventors: Kanghee Lee, Gwangjin-gu (KR); Sumin Lee, Seoul (KR); Minje Park, Seongnam (KR); Tae-Hoon Kim, Seoul (KR)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/491,698

(22) Filed: Sep. 19, 2014

(65) Prior Publication Data

US 2016/0086316 A1    Mar. 24, 2016

(51) Int. Cl.
G06K 9/00 (2006.01)
G06T 5/00 (2006.01)
G06T 5/20 (2006.01)
H04N 9/64 (2006.01)

(52) U.S. Cl.
CPC . G06T 5/002 (2013.01); G06T 5/20 (2013.01); H04N 9/643 (2013.01); H04N 9/646 (2013.01); G06T 2207/10004 (2013.01); G06T 2207/20028 (2013.01); G06T 2207/20182 (2013.01)

(58) Field of Classification Search
None
See application file for complete search history.

(56) References Cited

U.S. PATENT DOCUMENTS

| | | | |
|---|---|---|---|
| 8,285,033 B2* | 10/2012 | Das Gupta | G06T 5/002 348/272 |
| 8,588,541 B2 | 11/2013 | Hong | |
| 8,594,445 B2* | 11/2013 | Cox | G06G 5/02 345/611 |
| 2006/0066912 A1* | 3/2006 | Kagaya | H04N 1/628 358/302 |
| 2007/0009167 A1* | 1/2007 | Dance | G06T 5/009 382/254 |
| 2007/0172119 A1* | 7/2007 | Pan | G06K 9/4652 382/162 |
| 2008/0056566 A1 | 3/2008 | Shehata et al. | |

(Continued)

FOREIGN PATENT DOCUMENTS

| | | |
|---|---|---|
| JP | 2004-005660 A | 1/2004 |
| JP | 2006072770 A | 3/2006 |
| KR | 10-2014-0071119 A | 6/2014 |

OTHER PUBLICATIONS

Tunjic, Bruno. "Edge-preserving Smoothing Methods: Overview and Comparison." <http://www.bruno.com.ba/files/TextureFlattening.pdf>, (2012).*

(Continued)

*Primary Examiner* — Andrae S Allison
(74) *Attorney, Agent, or Firm* — Green, Howard & Mughal LLP

(57) ABSTRACT

System, apparatus, method, and computer readable media for on-the-fly captured image data enhancement. An image or video stream is enhanced with a filter in concurrence with generation of the stream by a camera module. In one exemplary embodiment, HD image frames are filtered at a rate of 30 fps, or more, to enhance human skin tones with an edge-preserving smoothing filter. In embodiments, the smoothing filter is applied to an image representation of reduced resolution, reducing computational overhead of the filter. The filtered image is then upsampled and blended with a map that identifies edges to maintain an edge quality comparable to a smoothing filter applied at full resolution. A device platform including a camera module and comporting with the exemplary architecture may provide enhanced video camera functionality even at low image processing bandwidth.

23 Claims, 7 Drawing Sheets

(56) References Cited

U.S. PATENT DOCUMENTS

| | | | |
|---|---|---|---|
| 2008/0187224 A1* | 8/2008 | Wang | G06T 11/60 382/190 |
| 2009/0220147 A1* | 9/2009 | Batkilin | G06T 5/20 382/162 |
| 2009/0245679 A1 | 10/2009 | Ohwaki et al. | |
| 2009/0285480 A1* | 11/2009 | Bennett | G06K 9/40 382/167 |
| 2010/0014776 A1* | 1/2010 | Marchesotti | G06K 9/00234 382/275 |
| 2010/0194773 A1* | 8/2010 | Pan | G09G 5/02 345/590 |
| 2011/0013829 A1* | 1/2011 | Kim | G06T 5/002 382/165 |
| 2013/0229549 A1 | 9/2013 | Cinc et al. | |
| 2013/0336585 A1* | 12/2013 | Tian | G06T 5/002 382/167 |

OTHER PUBLICATIONS

Chen et al, Automatic Skin Color Beautification, vol. 30 of the series Lecture Notes of the Institute for Computer Sciences, Social Informatics and Telecommunications Engineering pp. 157-164.*

Chen et al., "Real-time Edge-Aware Image Processing with the Bilateral Grid", ACM Transactions on Graphics, Proceedings of ACM SIGGRAPH 2007, vol. 26, Issue 3, Article No. 103, Jul. 2007, 9 Pages.

Gastal et al., "Domain Transform for Edge-Aware Image and Video Processing", ACM Transactions on Graphics, Proceedings of SIGGRAPH 2011, vol. 30, No. 4, Article 69, 2011, 11 Pages.

He et al., "Guided Image Filtering", IEEE Transactions on Pattern Analysis and Machine Intelligence, vol. 35, Issue: 6, Oct. 2, 2012, 30 Pages.

International Search Report and Written Opinion received for PCT Patent Application No. PCT/US2014/031869, mailed on Jul. 10, 2014, 11 Pages.

Tomasi et al., "Bilateral Filtering for Gray and Color Images", Proceedings of the 1998 IEEE International Conference on Computer Vision, Jan. 4-7, 1998, 8 Pages.

Yang et al., "Real-Time O(1) Bilateral Filtering", IEEE Conference on Computer Vision and Pattern Recognition, Jun. 20-25, 2009, pp. 557-564.

Yang et al., "Recursive Bilateral Filtering", Proceedings of the 12th European conference on Computer Vision, vol. Part 1, 2012, pp. 399-413.

International Search Report and Written Opinion for International Patent Application No. PCT/US2015/044734, mailed on Dec. 28, 2015.

* cited by examiner

REAL TIME SKIN SMOOTHING IMAGE ENHANCEMENT FILTER

BACKGROUND

A digital camera is a component often included in commercial electronic media device platforms. Digital cameras are now available in wearable form factors (e.g., video capture earpieces, video capture headsets, video capture eyeglasses, etc.), as well as embedded within smartphones, tablet computers, and notebook computers, etc.

The introduction of streaming video from mobile digital cameras has ushered in an era with unprecedented volumes of video data shared between mobile devices. Consider an application where the user wears a pair of glasses fitted with a video camera. The camera captures video streams depicting the activities of the user throughout the day. Much of that data will capture human subjects. Since the introduction of digital image processing decades ago many users have become accustomed to reducing wrinkles, freckles, and various blemishes from human subjects for a more visually appealing image or video. There are several commercial image processing software packages with which users can remove wrinkles, freckles, etc. and adjust skin tone. However, these image processing software packages typically require so much user interaction and time that their use is intractable for the large amounts of image data now being generated.

Automated skin-smoothing image enhancement techniques have not kept pace with the need, particularly in the low-cost, and low-power market sector that includes wearable computing platforms and mobile communication handsets. There has been considerable research on fast and automated methods for skin smoothing. One currently popular technique is an edge-preserving filtering called a 'bilateral filter.' However, a bilateral filter has a high computational cost/complexity necessitating a powerful CPU and GPU to process high resolution images (e.g., full HD) in real-time (e.g., at 30+ frames per second). Since sharing images between mobile devices has become popular, a powerful CPU and GPU is not always available. Hence, many of the platforms responsible for generating the vast majority of a user's archival image data are thus far ill-equipped to perform sophisticated image processing.

Automated image data enhancement that can implemented by ultra light, low-cost, and low-power platforms in real time with a video stream captured at potentially high frame rates (e.g., 30 frames/second, or more) is therefore highly advantageous.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION OF EXEMPLARY EMBODIMENTS

Figure 1A:
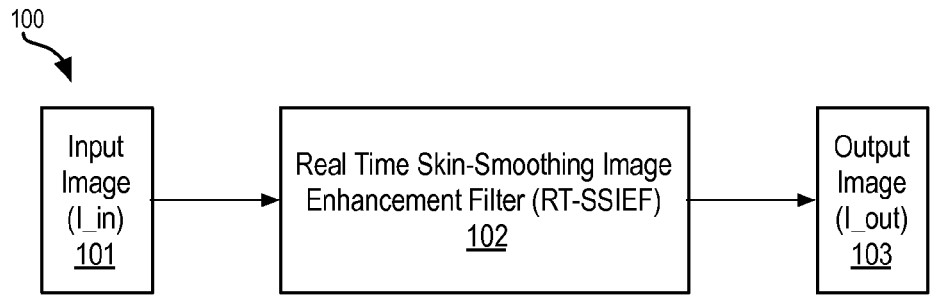
FIG. 1A is a real time (RT) skin smoothing image enhancement filtering system, in accordance with one or more embodiment.

One or more embodiments are described with reference to the enclosed figures. While specific configurations and arrangements are depicted and discussed in detail, it should be understood that this is done for illustrative purposes only. Persons skilled in the relevant art will recognize that other configurations and arrangements are possible without departing from the spirit and scope of the description. It will be apparent to those skilled in the relevant art that techniques and/or arrangements described herein may be employed in a variety of other systems and applications beyond what is described in detail herein.

Reference is made in the following detailed description to the accompanying drawings, which form a part hereof and illustrate exemplary embodiments. Further, it is to be understood that other embodiments may be utilized and structural and/or logical changes may be made without departing from the scope of claimed subject matter. Therefore, the following detailed description is not to be taken in a limiting sense and the scope of claimed subject matter is defined solely by the appended claims and their equivalents.

In the following description, numerous details are set forth, however, it will be apparent to one skilled in the art, that embodiments may be practiced without these specific details. Well-known methods and devices are shown in block diagram form, rather than in detail, to avoid obscuring more significant aspects. References throughout this specification to "an embodiment" or "one embodiment" mean that a particular feature, structure, function, or characteristic described in connection with the embodiment is included in at least one embodiment. Thus, the appearances of the phrase "in an embodiment" or "in one embodiment" in various places throughout this specification are not necessarily referring to the same embodiment. Furthermore, the particular features, structures, functions, or characteristics described in the context of an embodiment may be combined in any suitable manner in one or more embodiments. For example, a first embodiment may be combined with a second embodiment anywhere the particular features, structures, functions, or characteristics associated with the two embodiments are not mutually exclusive.

As used in the description of the exemplary embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

As used throughout the description, and in the claims, a list of items joined by the term "at least one of" or "one or more of" can mean any combination of the listed terms. For example, the phrase "at least one of A, B or C" can mean A; B; C; A and B; A and C; B and C; or A, B and C.

The terms "coupled" and "connected," along with their derivatives, may be used herein to describe functional or structural relationships between components. It should be understood that these terms are not intended as synonyms for each other. Rather, in particular embodiments, "connected" may be used to indicate that two or more elements are in direct physical, optical, or electrical contact with each other. "Coupled" may be used to indicated that two or more elements are in either direct or indirect (with other intervening elements between them) physical, optical, or electrical contact with each other, and/or that the two or more elements co-operate or interact with each other (e.g., as in a cause an effect relationship).

Some portions of the detailed descriptions provide herein are presented in terms of algorithms and symbolic representations of operations on data bits within a computer memory. Unless specifically stated otherwise, as apparent from the following discussion, it is appreciated that throughout the description, discussions utilizing terms such as "calculating," "computing," "determining" "estimating" "storing" "collecting" "displaying," "receiving," "consolidating," "generating," "updating," or the like, refer to the action and processes of a computer system, or similar electronic computing device, that manipulates and transforms data represented as physical (electronic) quantities within the computer system's circuitry including registers and memories into other data similarly represented as physical quantities within the computer system memories or registers or other such information storage, transmission or display devices.

While the following description sets forth embodiments that may be manifested in architectures such system-on-a-chip (SoC) architectures for example. Implementation of the techniques and/or arrangements described herein are not restricted to particular architectures and/or computing systems, and may be implemented by any architecture and/or computing system for similar purposes. Various architectures employing, for example, multiple integrated circuit (IC) chips and/or packages, and/or various computing devices and/or consumer electronic (CE) devices such as set-top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. Furthermore, some material such as, for example, control structures and full software instruction sequences, may not be shown in detail in order not to obscure the material disclosed herein.

Certain portions of the material disclosed herein may be implemented in hardware, for example as logic circuitry in an image processor. Certain other portions may be implemented in hardware, firmware, software, or any combination thereof. At least some of the material disclosed herein may also be implemented as instructions stored on a machine-readable medium, which may be read and executed by one or more processors (graphics processors and/or central processors). A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other similarly non-transitory, tangible media.

One or more system, apparatus, method, and computer readable media is described below for real-time image enhancement. In "real-time" image enhancement, an image data (video) stream is enhanced frame-by-frame concurrently with frame-by-frame generation of the stream. The enhancement algorithm is operable at the frame level, and may be performed on every consecutive image frame, or on a subset of frames such as key frames. The rate requirement for real-time image enhancement is a function of a frame rate associated with the CM. As described below, a device platform including a CM and comporting with the exemplary architecture may provide (video) camera functionality with real time image enhancement within the power and processing bandwidth constraints typical of current mobile handsets.

FIG. 1A is a real time (RT) skin smoothing image enhancement filtering system 100, in accordance with one or more embodiment. Image enhancement system 100 includes a RT skin smoothing image enhancement filter 102 that receives input image data (I_in) 101 and generates output image data (I_out). Input image data 101 is a representation of an image frame provided in any suitable color space or image file format. For example, input image data 101 may be a decoded representation of an image stored in a memory. In another example, input image data 100 is written to a buffer by a CM as the data is readout from an image sensor in the CM. Input image data 101 includes a plurality of pixel values that are spatially correlated within an image frame. The number of pixel values within one image frame of image data depends on the input image resolution, which in further embodiments is a function of a local CM. Although embodiments herein are applicable to any input image resolution, in the exemplary embodiment input image data 101 is a 1920×1080 pixel (2.1 megapixel) representation of an image frame (i.e. Full HD). In exemplary embodiments, input image data 101 is in the YUV (luma Y and chrominance U, V) color space. Input image data 101 may have been preprocessed upstream of system 100 to convert to the YUV space from another color space such as the RGB (red-green-blue) color space, the $YP_BP_R$ (luma, blue difference chroma $Y_B$, and red difference chroma $P_R$) color space, or the $YC_BC_R$, (luma Y, blue difference chroma $C_B$, and red difference chroma $C_R$) color space, or the like.

As is discussed further herein, RT skin smoothing image enhancement filter 102 is to perform a filtering of input image data 101. While the filtering algorithm may be any known in the image processing art, to reduce computational load associated with the filtering algorithm, the algorithm is implemented at some resolution less than the input image resolution. Resultant loss of fidelity in the filtered image data is mitigated through a blending operation that modulates weighting of the filtered image data such that edges represented in the input image data are preserved around spatial regions that have been filtered. Regions to be filtered may be detected based on some skin tone detection criteria that may be a user defined configuration, and/or received from a system driver, and/or set to a default, etc. RT skin smoothing image enhancement filter 102 generates blended pixel values as output image data 103. In the exemplary embodiment output image data 103 is also in YUV color space. As described further herein, output image data 103 is a blend of input image data 101 and filtered input image pixel values. The blending is based on a pixel-level blending coefficient, which is determined from the pixel scores. For example, where a pixel has a higher score, the output pixel value will be a blend more heavily weighting the filtered pixel value than the input pixel value, while a pixel with a lower score will be output as a blend more heavily weighting the input pixel value. The blending may be applied to each pixel value of input image data 101 to generate output image data 103 maintaining the input image resolution. Downstream of system 100, output image data 103 may be stored to memory. Output image data 103 may be further post-processed, and/or presented on a display. For example, the output image data 103 may receive a further image enhancement, and/or be encoded into compressed representation of the image frame (e.g., in compliance with MPEG-4, H.264 AVC codecs, or the like).

Figure 1B:
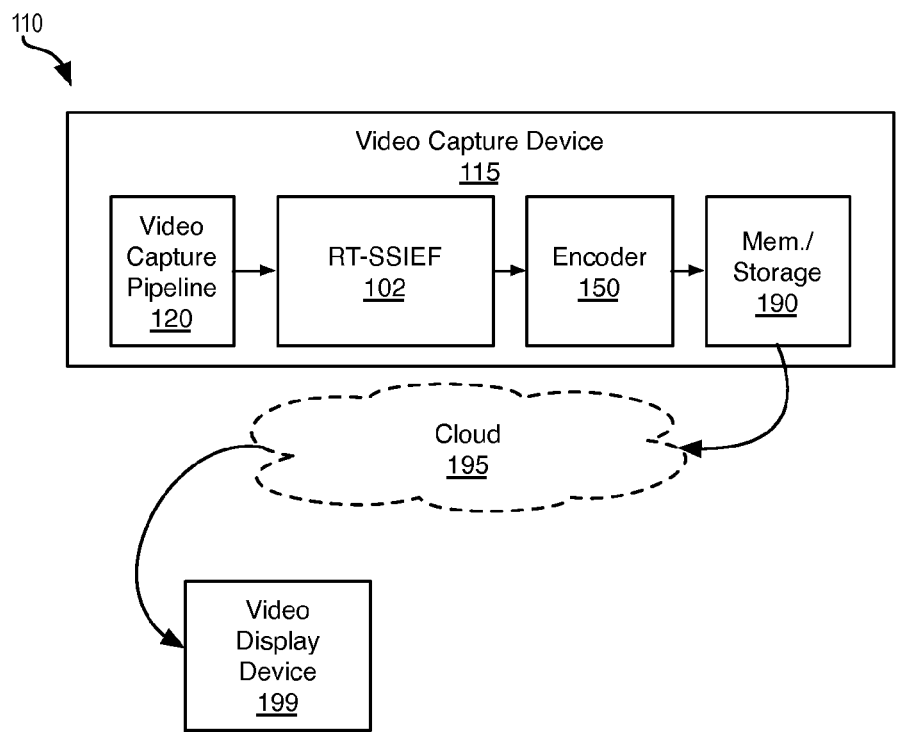
FIG. 1B is a functional block diagram of a system including a RT skin smoothing image enhancement filtering system, in accordance with embodiments.

FIG. 1B is a functional block diagram of a system 110 including a video data stream capture device 115 and a display device 199. Video capture device 115 includes RT skin smoothing image enhancement filter 102, in accordance with embodiments. In a first embodiment, capture device 115 includes RT skin smoothing image enhancement filter 102 coupled between a video capture pipeline 120 and a video encoder 150. Video capture pipeline 120 streams consecutively exposed video data frames at a frame rate (e.g., 30, 60, 120, 240, 480 fps, etc.) to an output port coupled to an input port of a RT skin smoothing image enhancement filter 102. Video pipeline 120 includes a sensor operative to output raw video data associated with multiple consecutively exposed frames in conformance with any known streaming protocol, such as a MIPI or other protocol. In the exemplary embodiment, xvYCC pixel data output by video pipeline 120 is converted to YUV(Cb,Cr) format by any known decoding circuitry (not depicted). An output port of RT skin smoothing image enhancement filter 102 is coupled to an input port of encoder 150. An output port of encoder 150 is coupled to an input port of memory (storage) 190. An encoded representation of enhanced image frames output from memory 190 is coupled over a wired or wireless communication channel to display device 199, which in the exemplary embodiment is coupled to capture device 115 through a backend server in cloud 195. In alternate embodiments where cloud 195 is absent, display device 199 directly couples to video capture device 115 over a local wired or wireless communication channel. In still other embodiments, display device 199 is integrated into video capture device 115 (i.e., both devices are part of the same platform).

Figure 2:
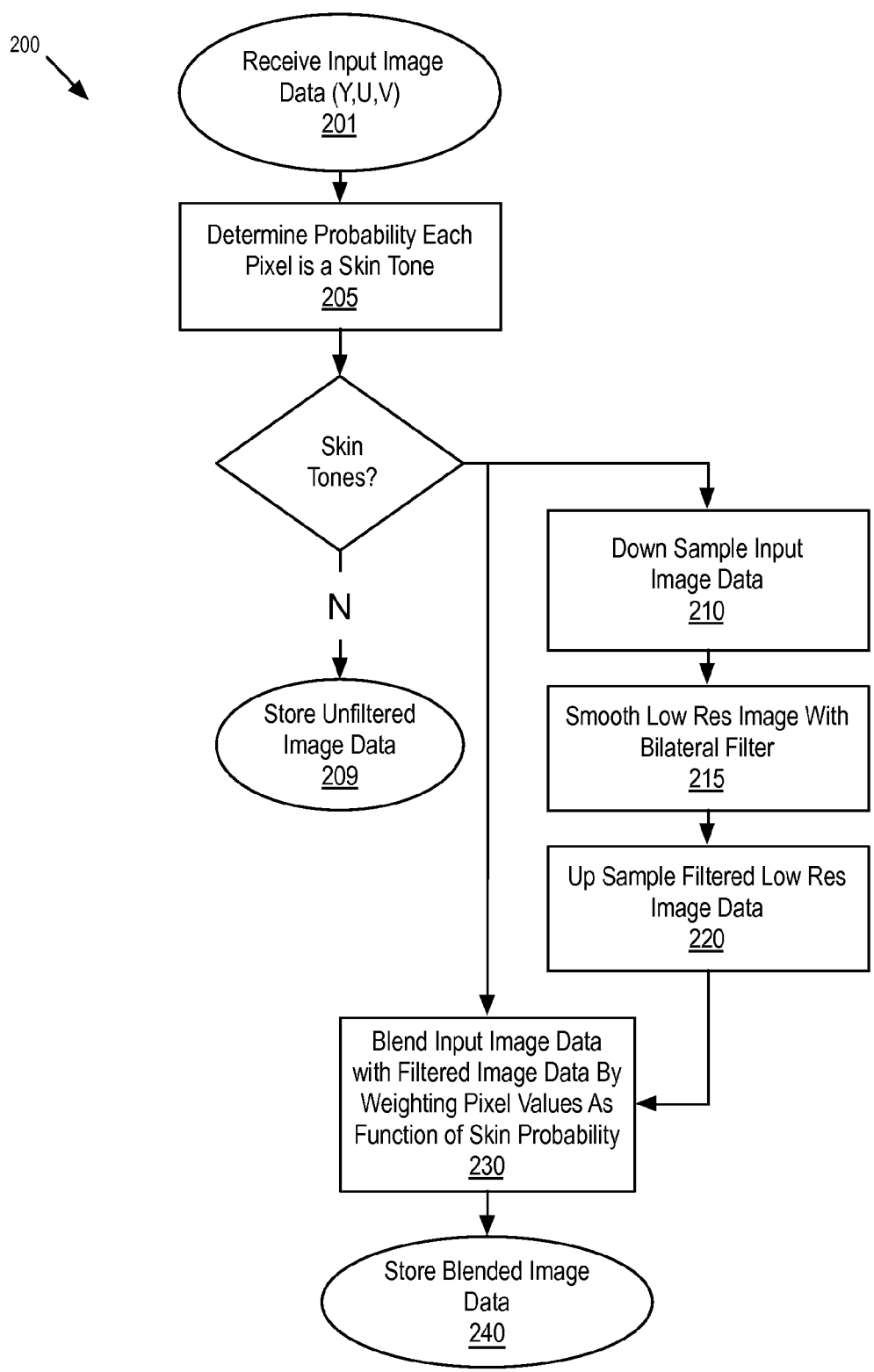
FIG. 2 is a flow diagram illustrating a RT skin smoothing image enhancement method, in accordance with one or more embodiment.
Figure 3:
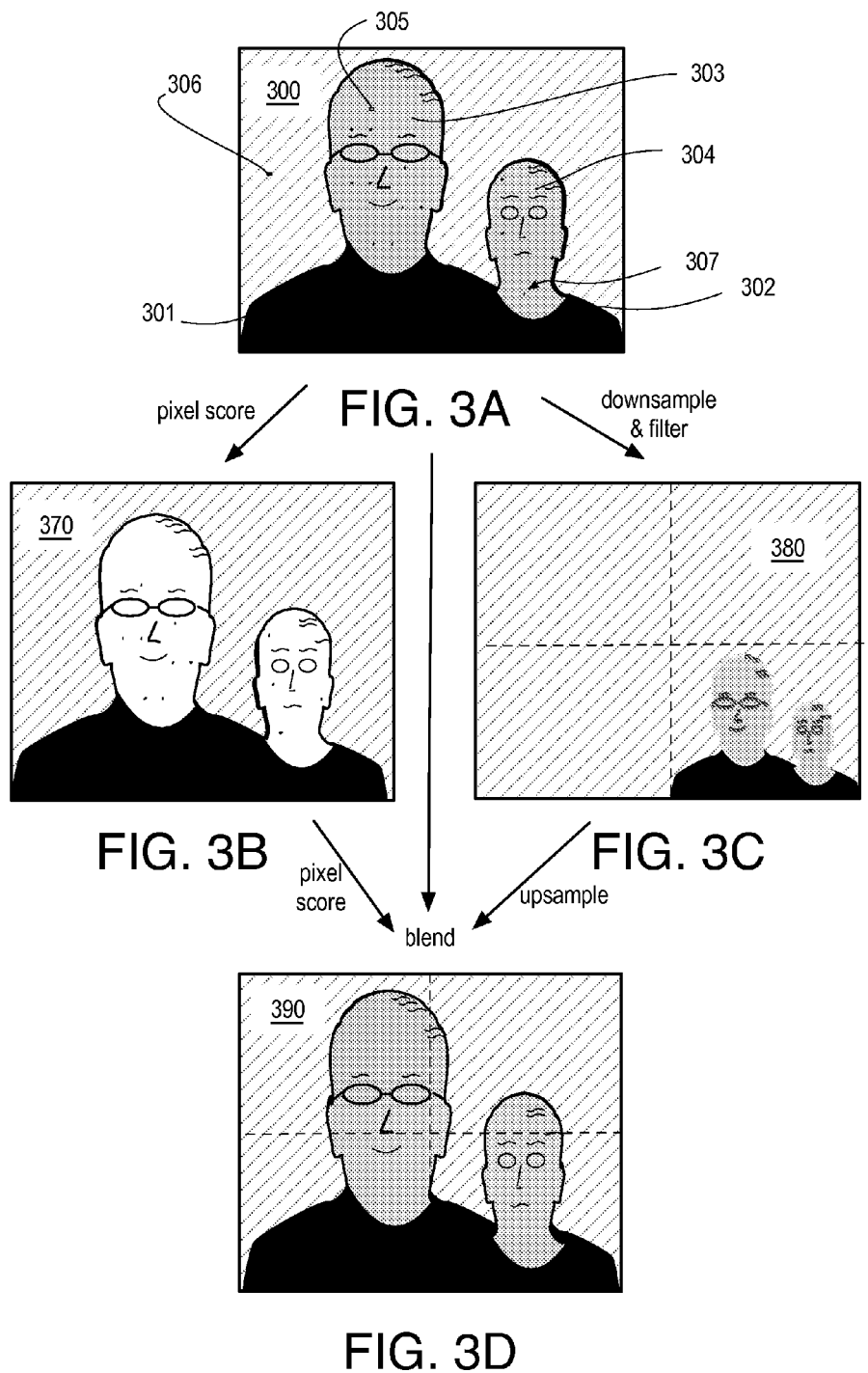
FIGS. 3A, 3B, 3C and 3D illustrate representative analysis results for an input image data frame filtered in accordance with one or more skin smoothing embodiment.

FIG. 2 is a flow diagram illustrating a RT skin smoothing image enhancement filtering method 200, in accordance with one or more embodiment. Each of the operations illustrated in FIG. 2 may be considered stages in the method 200 with each stage advantageously performed in real time to generate skin smoothened output image data in real time with a given latency associated with the stages. The RT skin smoothing image enhancement filter 102 illustrated in FIGS. 1A and 1B may for example implement automated skin smoothing method 200. FIGS. 3A, 3B, 3C and 3D illustrate representative analysis results for an input image data frame filtered in accordance with the skin smoothing method 200.

Method 200 begins with receiving input image data at operation 201. In the exemplary embodiment, the input image data received at operation 201 is the input image data 101 described above. The input image data received at operation 201 includes pixel values representing an image frame at an input image resolution, such as, but not limited to 1920×1080. FIG. 3A illustrates an input image 300 including a plurality of pixels. A first pixel 305 is inside of a skin tone region 303, while a second pixel 306 is outside of skin tone regions 303, 304. General areas 301, 302 may include any areas that are not skin tone areas such as background (e.g., general area 301) and clothing (e.g., general area 302) or the like. Skin tone regions 303, 304 may include any areas that qualify as skin toned based on skin tone detection scores, as discussed further below.

At operation 205, individual pixel values within the image frame are scored, based on filtering criteria. The pixel scores determined at scoring operation 205 are ultimately indicative of blending coefficients or blending weights subsequently employed in method 200. With each pixel within a frame receiving a score, the pixel scores are collectively indicative of a blending coefficient map within the image frame represented by input image data 101. In embodiments, each pixel score determined at operation 205 is indicative of a probability that the pixel satisfies a filtering criteria that may, for example, be based on a luma and/or chroma component target or center value ($U_c$, $V_c$). In one exemplary embodiment, the filtering criteria is color-based skin tone test with each pixel receiving a skin tone detection score indicative of the probability that the pixel is a skin tone. Where a skin tone detection score is provided for each pixel of input image data 101, the skin tone detection scores determined at operation 205 collectively represent a skin map spatially correlated within the image frame represented by input image data 101.

In advantageous embodiments, the skin tone detection score is a continuous value between 0 and 1, inclusive, that is proportional to a probability the individual pixel is a skin tone. As one example, a score of 0 may indicate a first (e.g., very low) likelihood the pixel is a skin tone pixel while a score of 1 may indicate a second (e.g., very high) likelihood the pixel is a skin tone pixel. Skin tone detection score 204 may of course be provided over any other range such as 0 to 10, 0 to 100, etc. With pixel scores ranging between 0 and 1, the pixel score generated at operation 205 may be directly employed in a subsequent blending function. Alternatively, an intermediate mapping may be performed to convert the pixel scores determined at operation 205 into suitable blending coefficient values. The intermediate mapping may be with any predetermined default or user definable mapping function.

In embodiments, the skin tone detection score is determined based on a comparison with a center of skin color ($U_c$, $V_c$). A center of skin color may be received from an outside source (e.g., a memory, a driver, or another system component). The center of skin color may include any data (e.g., $U_c$, $V_c$ in the YUV color space) indicating a center of skin color such that a pixel having a matching color is likely to be a skin tone pixel. For example, center of skin color may vary between predetermined default values based on the skin tones associated with expected subjects of an input image frame.

The skin tone probability for an input pixel value may be calculated based on a pre-learned skin tone model. There are many pixel-based models for assessing a probability that a pixel is a skin tone, and embodiments herein may employ any such technique at operation 205. These techniques are distinguished from facial recognition techniques and have the advantage of appropriately scoring non-facial skin regions. As one example, a skin tone model may entail a statistically defined distribution of a skin color as a cluster in the 3D YUV domain such that the center of the cluster is considered the "exact" skin tone value (e.g., the center of the cluster may be center of skin color $U_c$, $V_c$). If a pixel matches the center of the cluster, the probability/likelihood the pixel is a skin tone pixel may be at a maximum. The likelihood decreases as the pixel value moves further away from the center within the cluster. The likelihood may be further defined to be zero outside of the cluster. Any technique may be used to determine whether an input pixel value is within the cluster and to determine its skin tone detection score based on proximity to the center of the cluster. In one exemplary embodiment, intersections of the cluster's projections onto three planes (e.g., the UV plane or VU plane, the YV plane or VY plane, and the YU or UY plane) are utilized to detect whether an input pixel is within the cluster. As one example, the likelihood the pixel is a skin tone pixel in the UV plane may be determined based on a function modeling the distance relationship between the input pixel and the transformed/projected center of the cluster). The function may calculate a likelihood that increases from zero to one as a pixel moves toward center of skin color (e.g., $U_c$, $V_c$).

In further embodiments, operation 205 additionally entails inputting the map of pixel scores into a spatial smoothing filter, which reduces noise in the pixel scoring. The scoring map output by the detection algorithm (e.g., skin tone detection algorithm) is an input to the smoothing filter. Any spatial smoothing filter known to be suitable for this purpose may be utilized at operation 205 with examples including, but not limited to, low pass convolution filters employing a smoothing mask, such as a Gaussian mask. FIG. 3B illustrates a simplified skin map 370 that could be constructed after operation 205. For clarity, FIG. 3B depicts only maximum and minimum pixel scores generated at operation 205. In FIG. 3B, pixels having a highest probability of skin tone are represented as white (e.g., skin detection score of 1), while black represents pixels having a lowest probability of skin tone (e.g., skin detection score of 0). Although not illustrated for the sake of clarity, any number of "gray" levels between the binary levels illustrated in FIG. 3B may be further generated at operation 205.

Method 200 continues at operation 210. In some embodiments, performance of operation 210 (and subsequent operations) may be predicated upon at least a threshold number of pixels having at least a threshold pixel score indicative of the presence of skin tone within the image frame represented by the input image data. Where the threshold criteria (e.g., minimum skin tone detection score) are not satisfied, method 200 may be terminated at operation 209 with the unfiltered input image data stored to memory. Hence, in the absence of sufficient skin tone, automated skin smoothing method 200 may be bypassed.

In response to satisfying the threshold criteria (e.g., sufficient skin regions were detected), the input image data 101 is downsampled at operation 210 to change the pixel grid (i.e., change the image size to contain fewer pixels). Downsampling of the input image data to a lower resolution representation of the image frame has the advantage of reducing the image processing requirements of smoothing operations subsequently performed in method 200. Many image minifying algorithms are known (e.g., Bresenham, nearest neighbor, bicubic interpolation, etc.), and relative to other operations in method 200, image size reduction algorithms are generally fast, and not highly complex computationally. There are therefore many known downsampling filters suitable for real time scaling (e.g., 30+ FPS) of the input image data (e.g., Full HD) with a given image and/or applications processor. In exemplary embodiments, downsampling operation 210 employs pixel replication and/or nearest neighbor sampling to advantageously reduce the image resolution by at least a factor of 2 and ideally a factor of 4, or more.

Method 200 then continues with operation 215 where the downsampled image generated at operation 210 is enhanced with a skin smoothing filter. At operation 215, pixel values of the downsampled image are smoothed based on values of the downsampled image pixels neighboring an input pixel. In embodiments, an edge-preserving smoothing filter is employed to smoothen the downsampled image, removing texture while avoiding edges that may cause visible artifacts. In one advantageous embodiment, a bitlateral filter is employed at operation 210. The bilateral filter has the advantage of preserving edges, but relative to other operations in real time skin smoothing method 200, the filter is computationally costly/complex to implement. In the basic form, the bilateral filter is a non-linear filter employing both a spatial and a range kernel to replace the intensity value at each pixel in an image with a weighted average of intensity values from nearby pixels:

$$I_f(x) = \frac{1}{W_p} \sum_{x_i \in \Omega} I_{lo\ res}(x_i) f_r(\|I(x_i) - I(x)\|) g_s(\|x_i - x\|), \quad \text{(Eq. 1)}$$

where $I_f$ is the filtered image data, $I_{lo\ res}$ is the downsampled input image data, x is the coordinate of the pixel being filtered, $f_r$ is the range kernel for intensity smoothing and $g_s$ is the spatial kernel for coordinate smoothing, and $W_p$ is a normalization term to maintain total image energy. For many bilateral filter implementations, computational complexity is a polynomial function of dimensionality (e.g., $D^2$). The complexity of bilateral filtering a 4× downsampled image is therefore reduced by approximately a factor of 16 relative to filtering the input image data at the input image resolution. In further embodiments, a fast bilateral filter is employed, which can further enable ultra-low power/bandwidth processors to implement skin smoothing method 200 in real time. The fast bilateral filter is advantageously capable of filtering color images and in the exemplary embodiment entails a recursive implementation of the bilateral filter. Some recursive bilateral filter algorithms have the advantage of being linear with respect to the number of pixels through the application of a domain transform, and are therefore significantly more computationally efficient.

Notably, image and/or application processors of many mobile devices hosting camera modules (e.g., current handsets) are incapable of real time filtering a Full HD image frame even with a recursive bilateral filter algorithm. However, 30+ FPS filtering becomes possible for the downsampled images output by operation 210. Depending on the computational power of a platform's processor, as well the frame rate and resolution of input image data, the downsampling factor may be varied as needed (e.g., between 2× and 4×) to ensure real time smoothing at operation 215. FIG. 3C illustrates a downsampled and smoothed image 380 that might be constructed from image data available following operation 215, in accordance with one exemplary embodiment.

Skin smoothing method 200 continues at operation 220 where the filtered low-resolution image data is upsampled (upsized) back to the input image resolution. The magnification operation 220 effectively increases size/dimensionality of the output of smoothing filtering operation 215. Upsampling to higher pixel count has significant computational complexity/cost, and so the choice of upscaling algorithm may impact the overall rate of method 200. In advantageous embodiments, a bilinear interpolation of pixel values is performed at operation 220. Bilinear interpolation has the advantage of being computationally simple enough for an image and/or applications processor in most mobile devices (e.g., handsets) to upsample even a 4× downsampled image back to 1920×1080 in real time (e.g., at 30+ fps).

Skin smoothing method 200 continues at operation 230 where the input image data 101 received at operation 201 is blended with the upsampled filtered image data generated at operation 220. The blending of the two sets of image data is a function of the pixel scores determined at operation 205. Noting that even an edge preserving smoothing filter blurs edges, the use of the skin map generated at operation 205 improves retention of desirable edges (e.g., nose, face contours, eyebrows etc.) that might otherwise be distorted (blurred) or lost, particularly when filtered at the reduce image size. As illustrated in FIG. 3B, skin map 3B contains sharp edge information between skin and non-skin regions. In the exemplary embodiment, this edge information can be directly incorporated into the blending operation 230 by modulating of the weighting of the input image data relative to the filtered image data for the individual as a function of each pixel skin tone detection score.

In exemplary embodiments, the blending at operation 230 entails interpolating between a value (e.g., at least one of luma or chroma component) of a pixel in the input image data and a corresponding value of that pixel in the filtered image data based on the skin tone detection score for the pixel. In advantageous embodiments, the interpolation is linear with the blended pixel value being a weighted sum of the value of the pixel in the input image data and the value of the pixel in the filtered image data. The skin tone detection score weights the two pixel values complementarily. For example, where a pixel has a higher score indicating a greater probability the pixel is a skin tone, the output pixel value will be a blend more heavily weighting the filtered pixel value than the input pixel value, while a pixel with a lower score indicating a lower probability the pixel is a skin tone, will be output as a blend more heavily weighting the input pixel value. FIG. 3D illustrates an exemplary blended output image frame 390 with blemishes 307 present in input image frame 300 smoothed out.

Returning to FIG. 2, one iteration of method 200 performed on a given input image frame completes at operation 240 where the blended image data is stored to a memory, for example as the enhanced, skin-smoothed output image data 103. The blended image data may be further output to at least one of a display device or an encoder.

Figure 4:
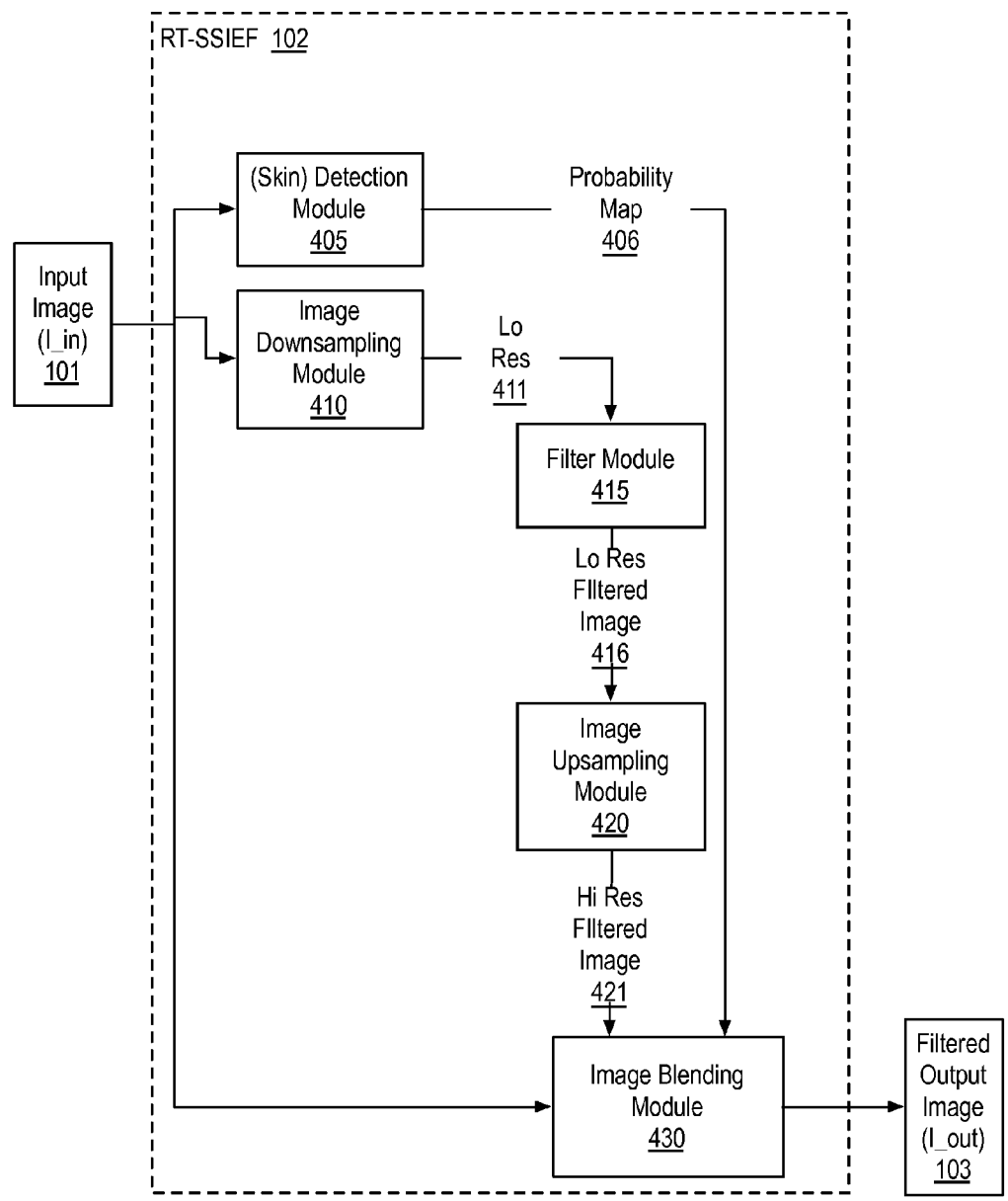
FIG. 4 is a functional block diagram of a RT skin smoothing image enhancement filter, in accordance with one or more embodiment.

FIG. 4 is a functional block diagram of a RT skin-smoothing image enhancement filter 102, in accordance with one or more embodiment. In exemplary embodiments, RT skin-smoothing image enhancement filter 102 is computerized to perform the skin smoothing method 200 in an automated fashion. RT skin-smoothing image enhancement filter 102 is to receive or retrieve the input image data 101 from a buffer storing at least one of a decoded representation of an input image frame, or a captured image exposed at the input image resolution by a camera hardware module. In one embodiment, input image data 101 is a stream of consecutively exposed image data frames written to the buffer by a camera hardware module at a given video frame rate. RT skin-smoothing image enhancement filter 102 includes logic to perform each of the pixel scoring, image data downsampling, image data upsampling, image data filtering, and image data blending as described above on each consecutively exposed video data frame at least at the video frame rate to void an input image frame buffer overrun.

As further shown in FIG. 4, RT skin-smoothing image enhancement filter 102 further includes a detection module 405 coupled to receive input image data 101. The detection module includes logic to determine a skin tone detection score for individual pixels of the image data. In the exemplary embodiment, detection module 405 is to determine a skin tone detection score (e.g., between 0 and 1) that is proportional to a probability that an individual pixel comprises a skin tone using any of the technique described above. In further embodiments, detection module 405 further includes logic to denoise the skin tone detection scores, for example with a spatial smoothing filter. The skin tone detection scores may be output in the form of skin tone probability map 406.

As further depicted in FIG. 4, downsampling module 410 is also coupled to receive input image data 101. Downsampling module 410 includes logic to downsample image data 101 to a representation of the image frame having a reduced resolution, lower than the input image resolution, for example using any of the techniques described above. A filter module 415 is coupled to receive the lower resolution downsampled image data 411, which is output by downsampling module 410. Filtering module 415 includes logic to smooth the downsampled image data, for example using any of the smoothing techniques described above. In one advantageous embodiment filtering module 415 includes logic to recursively bilaterally filter individual pixel values in the downsampled image.

As further illustrated in FIG. 4, RT skin-smoothing image enhancement filter 102 further includes an image upsampling module 420 coupled to receive the filtered downsample image data 416 output by filtering module 415. Upsampling module includes logic to upsample the filtered downsampled image data back to the input image resolution using any of the techniques described above. Blending module 430 is then coupled to receive input image data 101, high-resolution upsampled filter image data 421 output by upsampling module 420, and skin tone probability map 406. Blending module 430 includes logic to blend input image data 101 with the upsampled filtered image data 421 as a function of skin tone probability map 406. In advantageous embodiments, blending module 430 is to linearly interpolate between a luma and/or chroma value of a pixel in the input image data and a luma and/or chroma value of the corresponding pixel in the filtered image data based on the skin tone detection score for the pixel. For example, a weighted sum of the luma or chroma value of the pixel in the input image data and the luma or chroma value of the pixel in the filtered image data may be determined to weight the two luma or chroma values complementarily by the skin tone detection score.

Figure 5:
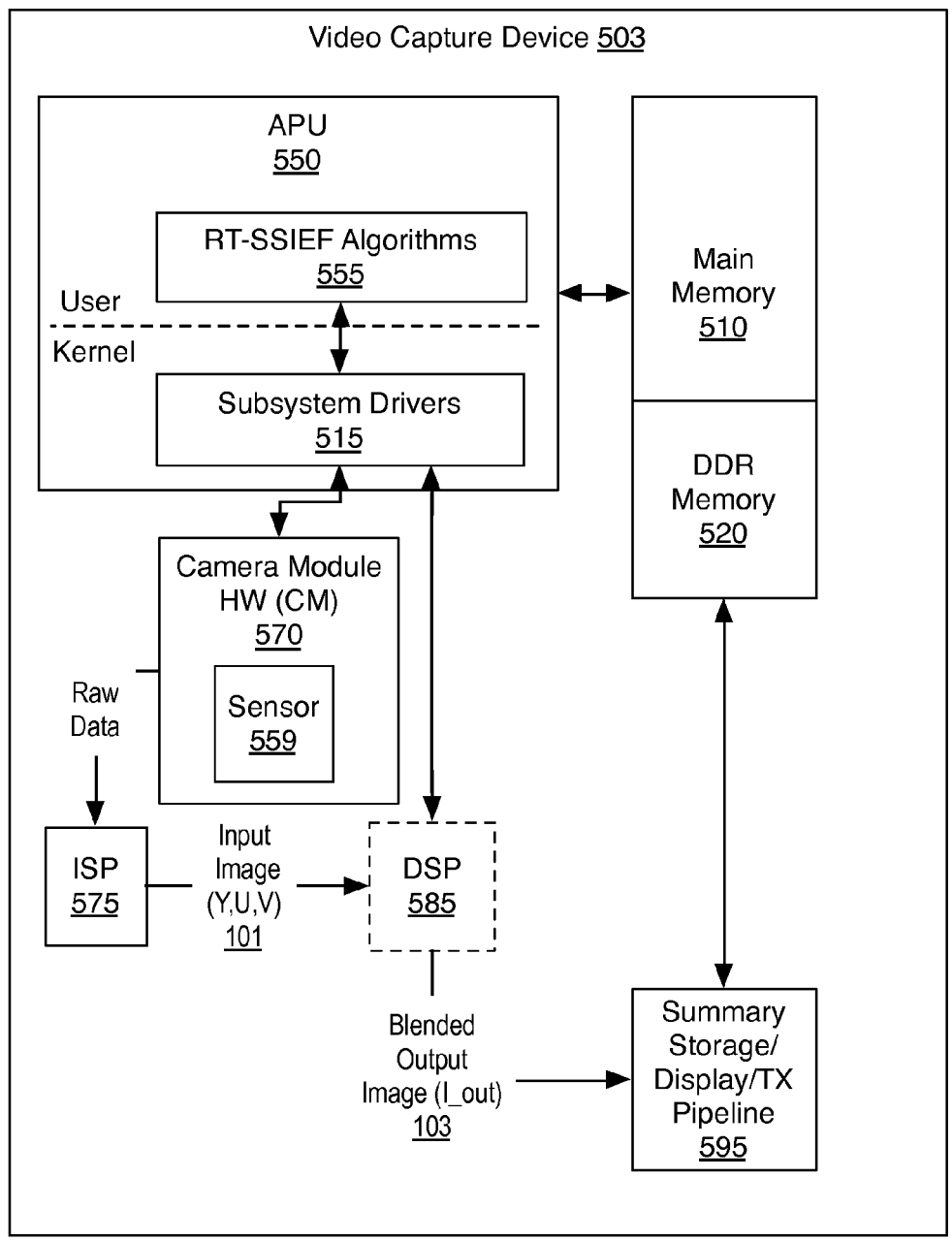
FIG. 5 illustrates a RT skin smoothing image enhancement filtering platform, in accordance with one or more embodiment.

FIG. 5 illustrates a RT skin-smoothing image enhancement filtering platform, in accordance with one or more embodiment. FIG. 5 further illustrates how RT skin-smoothing image enhancement filter 102 may be integrated with various other components of a mobile video capture device platform 503 to provide enhanced video camera output suitable for both high frame exposure rates and low image processing overhead. A mobile computing device may refer to any device having a processing system and a mobile power source or supply, such as one or more batteries, for example. Examples of a mobile computing device may include a laptop computer, tablet, touch pad, portable computer, handheld computer, palmtop computer, personal digital assistant (PDA), cellular telephone, combination cellular telephone/PDA, television, smart device (e.g., smartphone, tablet or smart television), mobile internet device (MID), messaging device, data communication device, and so forth. Examples of a mobile computing device also include computers and/or media capture/transmission devices configured to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

Platform 503 includes CM 570. In the exemplary embodiment, CM 570 further includes a camera sensor 559. Sensor 559 may be a HD, FHD, QXGA, WQXGA, or QSXGA-format digital image device, for example. Camera sensor 559 may provide a color resolution of 10 bits, or more per pixel, is operable to capture continuous video frames progressively. Sensor 559 may have a pixel frequency of 170 MHz, or more. Camera sensor 559 may include an RGB Bayer color filter, an analog amplifier, an A/D converter, other components to convert incident light into a digital signal corresponding to raw image data. Sensor 559 may be controlled to operate a rolling shutter or electronic focal plane shutter process where pixels are read out progressively in a line-sequential fashion for a frame. In exemplary video embodiments, sensor 550 outputs multiple consecutively exposed frames. CM 570 outputs raw data associated with the consecutively exposed frames in conformance with any known streaming protocol, such as a MIPI. Streamed raw video data is input to ISP 575. ISP 575 is to receive and analyze frames of raw video data 572 during the horizontal and/or vertical blanking periods associated with CM 570. During raw image data processing, ISP 575 may perform one or more of color space conversion, noise reduction, pixel linearization, and shading compensation, for example.

Pre-processed video data output by ISP 575 may be buffered in a FIFO manner queued as YUV input image data 101 ready for skin-smoothing image enhancement. In exemplary embodiments, DSP 385 and/or applications processor (APU) 550 implements one or more of the skin smoothing image enhancement modules depicted in FIG. 4. DSP 385 may for example include one or more fixed function, or semi-programmable logic circuits to perform one or more stages of the skin smoothing method 200 described above. For example, a fixed function module may be utilized to implement one or more of a spatially image filtering, image minification, image magnification, bilateral smoothing, or blending. Subsystem drivers 515 within a kernel space of an operating system (OS) instantiated by APU 550 may control various image processing parameters, such as a skin tone detection score mapping, a center skin tone, a minification factor, or a bilateral filter kernel. Access to the skin smoothing image enhancement control parameters may be provided through an application layer executing in a user space of the OS.

Embodiments employing fixed function logic are well suited to implementing skin smoothing method 200 at pace with a high exposure frame rate at minimal power. In alternative embodiments however, any known programmable processor, including a core of APU 550, an execution unit of a graphics processor, or other similar vector processor, is utilized to implement the logic of RT skin-smoothing image enhancement filter 102. For such embodiments, DSP 585 need not implement fixed function circuitry relevant to RT skin-smoothing image enhancement filter 102 (as denoted by dashed lines in FIG. 5). APU 550 is then solely responsible for generating blended output image data 103 from input image data 101 received from ISP 575. Such software-based implementations are advantageously more flexible than fixed function logic circuitry. In one exemplary embodiment, the skin-smoothing image enhancement filtering algorithms 555 are instantiated through the user space of APU 550. APU 550 executes these algorithms at a rate sufficient to perform the skin-smoothing method 200 in real time with frame generation. APU 550 may be programmed with instructions stored on a computer readable media to cause the processor to perform any of the operations of skin-smoothing method 200.

As further illustrated in FIG. 5, blended output image data 103 is output to storage/display/transmission pipeline 595. In one exemplary storage pipeline embodiment, output image data 103 is written to electronic memory 520 (e.g., DDR, etc.), which may be separate or a part of a main memory 510 accessible to APU 550. Alternatively, or in addition, storage/display/transmission pipeline 595 is to transmit summary frame data 597 off video capture device 503.

Figure 6:
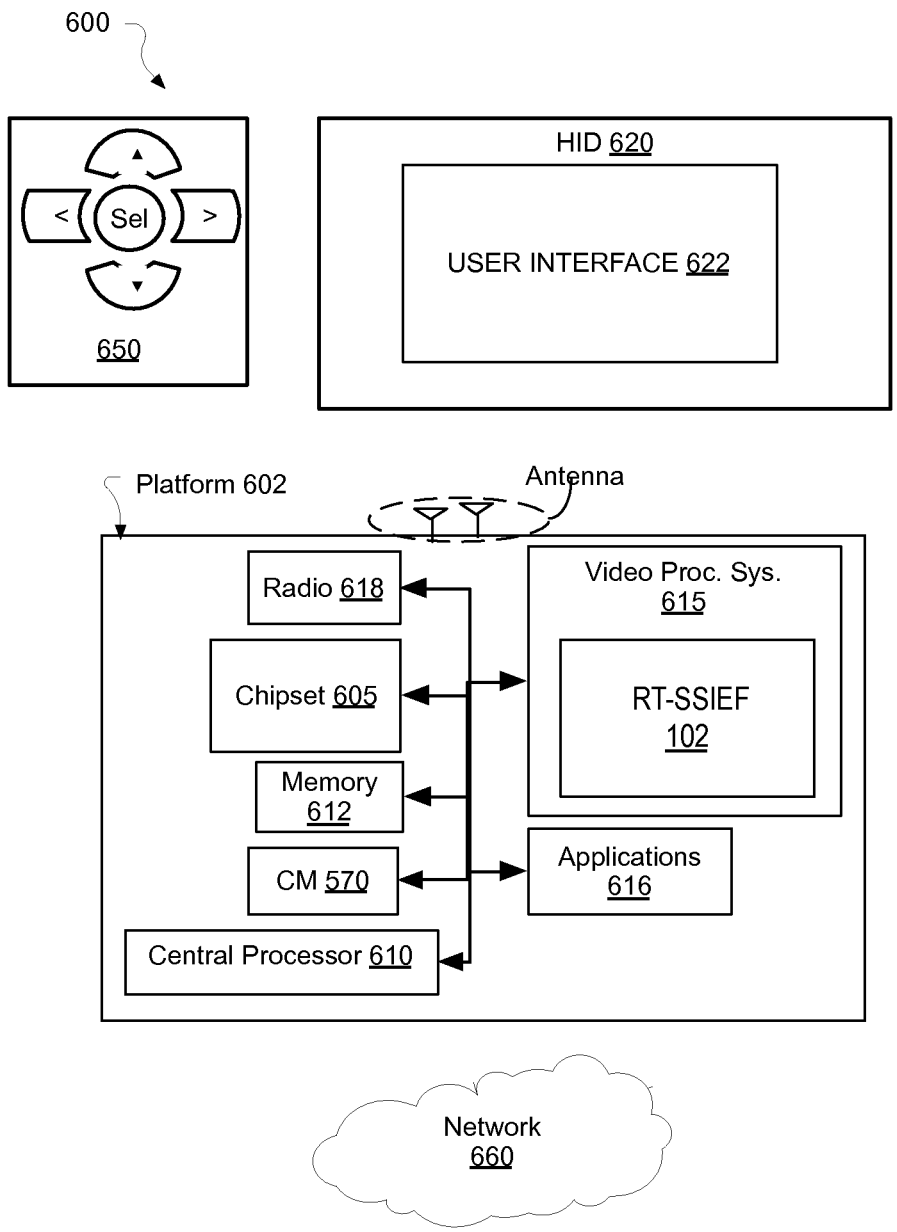
FIG. 6 is a diagram of an exemplary ultra-low power system employing a RT skin smoothing image enhancement filtering architecture, in accordance with one or more embodiment.

FIG. 6 is a diagram of an exemplary ultra-low power system 600 employing a RT skin smoothing image enhancement filter, in accordance with one or more embodiment. System 600 may be a mobile device although system 600 is not limited to this context. System 600 may be incorporated into a wearable computing device, laptop computer, tablet, touch pad, handheld computer, palmtop computer, cellular telephone, smart device (e.g., smart phone, smart tablet or mobile television), mobile internet device (MID), messaging device, data communication device, and so forth. System 600 may also be an infrastructure device. For example, system 600 may be incorporated into a large format television, set-top box, desktop computer, or other home or commercial network device.

System 600 includes a device platform 602 that may implement all or a subset of the various RT skin smoothing image enhancement methods and any of the RT skin smoothing image enhancement systems described above in the context of FIG. 1-FIG. 5. In various exemplary embodiments, video processor 615 executes RT skin smoothing image enhancement. Video processor 615 includes logic circuitry implementing RT skin smoothing image enhancement system 201 to smooth skin-toned regions of images synchronously with video frame data streamed from CM 570, for example as described elsewhere herein. In some embodiments, one or more computer readable media may store instructions, which when executed by CPU 610 and/or video processor 615, cause the processor(s) to execute one or more RT skin smoothing image enhancement algorithm, such as any of those described in detail above. One or more image data frame exposed by CM 570 may then be stored in memory 612 as enhanced image data.

In embodiments, device platform 602 is coupled to a human interface device (HID) 620. Platform 602 may collect raw image data with CM 570, which is processed and output to HID 620. A navigation controller 650 including one or more navigation features may be used to interact with, for example, device platform 602 and/or HID 620. In embodiments, HID 620 may include any television type monitor or display coupled to platform 602 via radio 618 and/or network 660. HID 620 may include, for example, a computer display screen, touch screen display, video monitor, television-like device, and/or a television.

Under the control of one or more software applications 616, device platform 602 may display user interface 622 on HID 620. Movements of the navigation features of controller 650 may be replicated on a display (e.g., HID 620) by movements of a pointer, cursor, focus ring, or other visual indicators displayed on the display. For example, under the control of software applications 616, the navigation features located on navigation controller 650 may be mapped to virtual navigation features displayed on user interface 622.

In embodiments, device platform 602 may include any combination of CM 570, chipset 605, processors 610, 615, memory/storage 612, applications 616, and/or radio 618. Chipset 605 may provide intercommunication among processors 610, 615, memory 612, video processor 615, applications 616, or radio 618.

One or more of processors 610, 615 may be implemented as one or more Complex Instruction Set Computer (CISC) or Reduced Instruction Set Computer (RISC) processors; x86 instruction set compatible processors, multi-core, or any other microprocessor or central processing unit (CPU).

Memory 612 may be implemented as a volatile memory device such as, but not limited to, a Random Access Memory (RAM), Dynamic Random Access Memory (DRAM), or Static RAM (SRAM). Memory 612 may also be implemented as a non-volatile storage device such as, but not limited to flash memory, battery backed-up SDRAM (synchronous DRAM), magnetic memory, phase change memory, and the like.

Radio 618 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In embodiments, system 600 may be implemented as a wireless system, a wired system, or a combination of both. When implemented as a wireless system, system 600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

The RT skin smoothing image enhancement systems and associated skin smoothing processes as described herein may be implemented in various hardware architectures, cell designs, or "IP cores."

Figure 7:
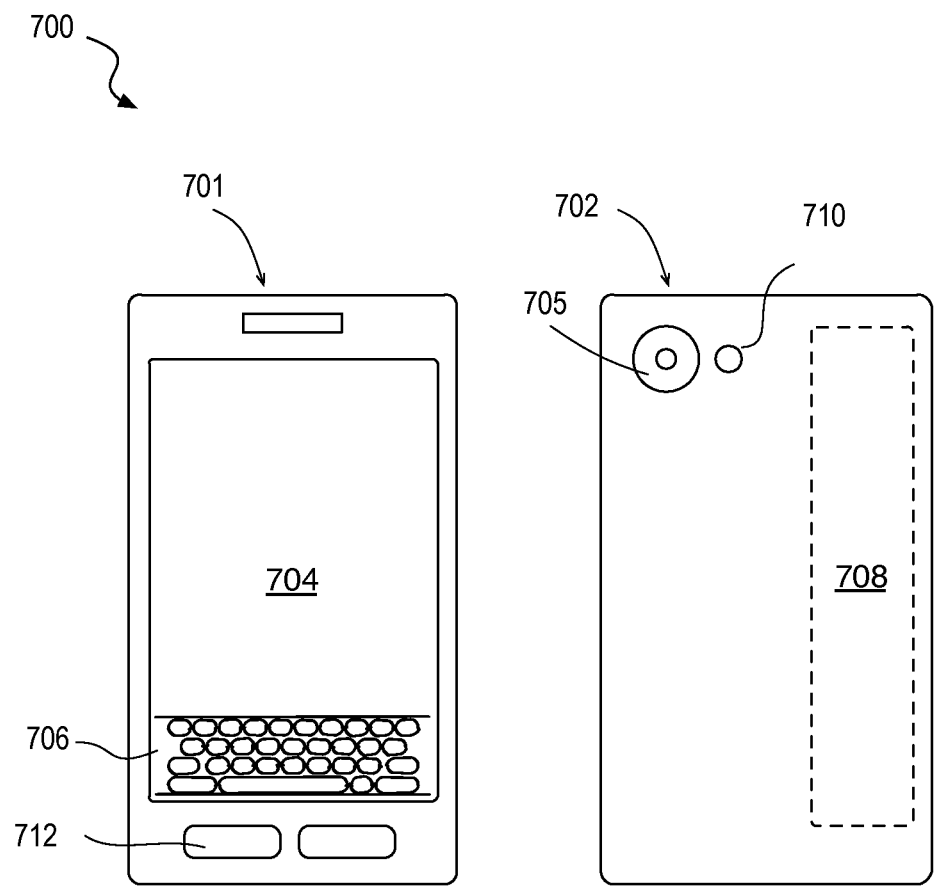
FIG. 7 is a diagram of an exemplary mobile handset platform, arranged in accordance with one or more embodiment.

As described above, system 600 may be embodied in varying physical styles or form factors. FIG. 7 further illustrates embodiments of a mobile handset device 700 in which system 600 may be embodied. In embodiments, for example, device 700 may be implemented as a mobile computing handset device having wireless capabilities. As shown in FIG. 7, mobile handset device 700 may include a housing with a front 701 and back 702. Device 700 includes a display 704, an input/output (I/O) device 706, and an integrated antenna 708. Device 700 also may include navigation features 712. Display 704 may include any suitable display unit for displaying information appropriate for a mobile computing device. I/O device 706 may include any suitable I/O device for entering information into a mobile computing device. Examples for I/O device 706 may include an alphanumeric keyboard, a numeric keypad, a touch pad, input keys, buttons, switches, microphones, speakers, voice recognition device and software, and so forth. Information also may be entered into device 700 by way of microphone (not shown), or may be digitized by a voice recognition device. Embodiments are not limited in this context. Integrated into at least the back 702 is camera 705 (e.g., including a lens, an aperture, and an imaging sensor), and a flash 710, both of which may be components of a CM through which streaming video is exposed and output to the video summarization system as described elsewhere herein.

As exemplified above, embodiments described herein may be implemented using hardware elements, software elements, or a combination of both. Examples of hardware elements or modules include: processors, microprocessors, circuitry, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software elements or modules include: applications, computer programs, application programs, system programs, machine programs, operating system software, middleware, firmware, routines, subroutines, functions, methods, procedures, software interfaces, application programming interfaces (API), instruction sets, computing code, computer code, code segments, computer code segments, data words, values, symbols, or any combination thereof. Determining whether an embodiment is implemented using hardware elements and/or software elements may vary in accordance with any number of factors considered for the choice of design, such as, but not limited to: desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable storage medium. Such instructions may reside, completely or at least partially, within a main memory and/or within a processor during execution thereof by the machine, the main memory and the processor portions storing the instructions then also constituting a machine-readable storage media. Programmable logic circuitry may have registers, state machines, etc. configured by the processor implementing the computer readable media. Such logic circuitry, as programmed, may then be understood to be physically transformed into a system falling within the scope of the embodiments described herein. Instructions representing various logic within the processor, which when read by a machine may also cause the machine to fabricate logic adhering to the architectures described herein and/or to perform the techniques described herein. Such representations, known as cell designs, or IP cores, may be stored on a tangible, machine-readable medium and supplied to various customers or manufacturing facilities to load into the fabrication machines that actually make the logic or processor.

While certain features set forth herein have been described with reference to embodiments, this description is not intended to be construed in a limiting sense. Hence, various modifications of the implementations described herein, as well as other implementations, which are apparent to persons skilled in the art to which the present disclosure pertains are deemed to be within the spirit and scope of the present disclosure.

The following paragraphs briefly describe some exemplary embodiments:

In one or more first embodiments, a computer implemented method of enhancing an image includes scoring, based on a filtering criteria, individual pixel values of image data representing an image frame at an input image resolution. The method includes downsampling the image data to a representation of the image frame having a reduced resolution, lower than the input image resolution. The method includes filtering the downsampled image data. The method includes upsampling the filtered downsampled image data back to the input image resolution. The method includes blending the input image data with the upsampled filtered image data as a function of the pixel scoring.

In furtherance of the first embodiment, blending the input image data with the filtered image data further comprises blending at least one of a luma value or a chroma value of individual pixels in the input image data with the luma or chroma value of corresponding pixels in the upsampled filtered image data.

In furtherance of the first embodiment, scoring pixels within the image frame further comprises determining a skin tone detection score for individual pixels of the input image. Blending the input image data with the filtered image data as a function of the pixel scoring further comprises modulating a weighting of the input image data relative to the filtered image data for the individual pixels as a function of each pixel skin tone detection score.

In furtherance of the embodiment immediately above, blending the input image data with the filtered image data as a function of the pixel scoring further comprises interpolating between a value of a pixel in the input image data and a value of the pixel in the filtered image data based on the skin tone detection score for the pixel.

In furtherance of the embodiment immediately above, linearly interpolating between the value of a pixel in the input image data and a value of the pixel in the filtered image data based on the skin tone detection score for the pixel further comprises determining a weighted sum of the value of the pixel in the input image data and the value of the pixel in the filtered image data, the two pixel values weighted complementarily by the skin tone detection score.

In furtherance of the embodiment immediately above, the skin tone detection score is a value between 0 and 1 that is proportional to a probability the individual pixel comprises a skin tone.

In furtherance of the first embodiment, filtering the down sampled image data further comprises smoothing a pixel value of the downsampled image based on values of the downsampled image pixels neighboring the pixel being smoothed with a bilateral filter.

In furtherance of the embodiment immediately above, filtering the down sampled image data further comprises performing a recursive bilateral filtering of pixel values in the downsampled image.

In furtherance of the first embodiment, the input image data comprises pixel values in a YUV color space. Downsampling the image data further comprises at least a 4× resolution reduction from the input image resolution. Upsampling the image data further comprises at least a 4× resolution increase from the downsampled image resolution.

In furtherance of the first embodiment, the method further includes retrieving the input image data from a buffer storing at least one of a decoded representation of the image, or a captured image exposed at the input image resolution by a camera module. The method further includes converting, prior to scoring the pixels, the input image data from RGB color space to YUV color space. The method further includes storing the blended image data to a memory.

In furtherance of the embodiment immediately above, the method further includes outputting the blended image data from the memory to at least one of a display device or an encoder.

In furtherance of the embodiment above, the method further includes writing a stream of consecutively exposed image data frames from a camera hardware module (CM) to the buffer at a video frame rate. The method further includes performing each of the pixel scoring, image data downsampling, image data upscaling, image data filtering, and image data blending on each consecutively exposed video data frame at least at the video frame rate.

In one or more second embodiments, a computerized image enhancement system, includes a detection module coupled to receive input image data representing an image frame at an input image resolution, the detection module including logic to determine a skin tone detection score for individual pixels of the image data. The system includes a downsampling module coupled to receive the input image data, the downsampling module including logic to downsample the image data to a representation of the image frame having a reduced resolution, lower than the input image resolution. The system includes a filtering module coupled to receive the downsampled image data, the filtering module including logic to smooth the downsampled image data. The system includes an upsampling module coupled to receive the filtered downsample image data, the upsampling module including logic to upsample the filtered downsampled image data back to the input image resolution. The system includes a blending module coupled to receive the input image data, the skin tone detection scores, and the upsampled filter image data, wherein the blending module includes logic to blend the input image data with the upsampled filtered image data as a function of the skin tone detection scores.

In furtherance of the second embodiment, the detection module is to determine a skin tone detection score that is proportional to a probability that an individual pixel comprises a skin tone. The blending module is to interpolate between a luma or chroma value of a pixel in the input image data and a luma or chroma value of the corresponding pixel in the filtered image data based on the skin tone detection score for the pixel.

In furtherance of the embodiment immediately above, the filtering module includes logic to bilaterally filter individual pixel values in the downsampled image. The blending module include logic to linearly interpolate between a luma or chroma value of a pixel in the input image data and a luma or chroma value of the corresponding pixel in the filtered image data by determining a weighted sum of the luma or chroma value of the pixel in the input image data and the luma or chroma value of the pixel in the filtered image data, the two luma or chroma values weighted complementarily by the skin tone detection score.

In furtherance of the second embodiment, the system further includes an applications processor including a user space and kernel space, the applications processor including logic circuitry to implement the filtering module and the blending module. The system further includes a camera hardware module (CM) coupled to the applications processor to generate a stream of input image data representing time consecutive image frames exposed at the input image resolution. The system further includes a memory coupled to the applications processor to store a representation of the blended image data output from the applications processor. The system further includes at least one of a display coupled to the memory to present the blended image data, and an encoder coupled to the memory to encode the blended image data into a compressed representation.

In furtherance of the embodiment immediately above, the detection module further comprises fixed function logic circuitry coupled to the applications processor, the fixed function logic circuitry to output the skin tone detection scores to the applications processor.

In one or more third embodiment, one or more computer-readable storage media has instructions stored thereon, which when executed by a processor, cause the processor to perform a method including scoring, based on a filtering criteria, individual pixel values of image data representing an image frame at an input image resolution. The instructions further cause the processor to downsample the image data to a representation of the image frame having a reduced resolution, lower than the input image resolution. The instructions further cause the processor to filter the downsampled image data. The instructions further cause the processor upsample the filtered downsampled image data back to the input image resolution. The instructions further cause the processor blend the input image data with the upsampled filtered image data as a function of the pixel scoring.

In furtherance of the third embodiment, the media further store instructions thereon, which when executed by a processor, cause the processor to score the pixels by determining a skin tone detection score between 0 and 1 that is proportional to a probability the individual pixel comprises a skin tone. The instructions further cause the processor to filter the downsampled image data by smoothing a pixel value of the downsampled image based on a value of one or more downsampled image pixel neighboring the pixel being smoothed. The instructions further cause the processor to blend the input image data with the upsampled filtered image data by blending at least one of a luma value or a chroma value of individual pixels in the input image data with the luma or chroma value of corresponding pixels in the upsampled filtered image data.

In furtherance of the third embodiment, the media further store instructions thereon, which when executed by a processor, cause the processor to blend at least one of a luma value or a chroma value of individual pixels in the input image data with the luma or chroma value of corresponding pixels in the upsampled filtered image data by determining a weighted sum of the luma or chroma value of the pixel in the input image data and the luma or chroma value of the pixel in the filtered image data, the two luma or chroma values weighted complementarily by the skin tone detection score.

In furtherance of the embodiment immediately above, the media further store instructions thereon, which when executed by a processor, cause the processor to smooth a pixel value of the downsampled image by performing a bilateral filtering of individual pixel values in the downsampled image.

In furtherance of the third embodiment, the media further store instructions thereon, which when executed by a processor, cause the processor to retrieve the input image data from a buffer storing at least one of a decoded representation of the image, or a captured image exposed at the input image resolution by a camera module. The instructions further cause the processor to convert, prior to scoring the pixels, the input image data from RGB color space to YUV color space. The instructions further cause the processor to store the blended image data to a memory.

In one or more fourth embodiment, one or more computer-readable storage media has instructions stored thereon, which when executed by a processor, cause the processor to perform any one of the first embodiments.

In one or more fifth embodiment, a video camera platform includes an image processing means to perform any one of the first embodiments. The platform further includes a camera hardware module (CM) to generate a stream of input image data representing time consecutive image frames exposed at the input image resolution. The platform further includes an electronic memory to store the blended image data.

In furtherance of the fifth embodiment, the image processing means further includes a detection means to receive input image data representing an image frame at an input image resolution, and to determine a skin tone detection score for individual pixels of the image data. The image processing means further includes a downsampling means to receive the input image data, and to downsample the image data to a representation of the image frame having a reduced resolution, lower than the input image resolution. The image processing means further includes a filtering means coupled to receive the downsampled image data and to smooth the downsampled image data. The image processing means further includes an upsampling means to receive the filtered downsample image data, and to upsample the filtered downsampled image data back to the input image resolution. The image processing means further includes a blending means coupled to receive the input image data, the skin tone detection scores, and the upsampled filter image data, and to blend the input image data with the upsampled filtered image data as a function of the skin tone detection scores.

In furtherance of the embodiment immediately above, the platform further includes a camera hardware module (CM) coupled to the applications processor to generate a stream of input image data representing time consecutive image frames exposed at the input image resolution. The platform further includes an electronic memory to store the blended image data output from the applications processor. The platform further includes at least one of a display to present the blended image data, or an encoder to encode the blended image data into a compressed representation.

It will be recognized that the embodiments are not limited to the exemplary embodiments so described, but can be practiced with modification and alteration without departing from the scope of the appended claims. For example, the above embodiments may include specific combination of features. However, the above embodiments are not limited in this regard and, in embodiments, the above embodiments may include undertaking only a subset of such features, undertaking a different order of such features, undertaking a different combination of such features, and/or undertaking additional features than those features explicitly listed. Scope should, therefore, be determined with reference to the appended claims, along with the full scope of equivalents to which such claims are entitled.

What is claimed is:
1. A computer implemented method of enhancing an image, comprising:
  determining a skin one detection score for individual pixels of input image data representing an image frame at an input image resolution;
  downsampling the input image data to a representation of the image frame having a reduced resolution, lower than the input image resolution;
  filtering the downsampled image data;
  upsampling the filtered downsampled image data back to the input image resolution; and
  blending the input image data with the upsampled filtered image data, wherein the blending comprises weighting the input image data relative to the upsampled filtered image data for the individual pixels as a function of each pixel skin tone detection score.

2. The method of claim 1, wherein blending the input image data with the filtered image data further comprises blending at least one of a luma value or a chroma value of individual pixels in the input image data with the luma or chroma value of corresponding pixels in the upsampled filtered image data.

3. The method of claim 1, wherein:
blending the input image data with the filtered image data as a function of the pixel scoring further comprises interpolating between a value of a pixel in the input image data and a value of the pixel in the filtered image data based on the skin tone detection score for the pixel.

4. The method of claim 3, wherein interpolating between the value of a pixel in the input image data and a value of the pixel in the filtered image data based on the skin tone detection score for the pixel further comprises determining a weighted sum of the value of the pixel in the input image data and the value of the pixel in the filtered image data, the two pixel values weighted complementarily by the skin tone detection score.

5. The method of claim 1, wherein the skin tone detection score is a value between 0 and 1 that is proportional to a probability the individual pixel comprises a skin tone.

6. The method of claim 1, wherein filtering the down sampled image data further comprises smoothing a pixel value of the downsampled image based on values of the downsampled image pixels neighboring the pixel being smoothed with a bilateral filter.

7. The method of claim 6, wherein filtering the down sampled image data further comprises performing a recursive bilateral filtering of pixel values in the downsampled image.

8. The method of claim 1, wherein:
the input image data comprises pixel values in a YUV color space;
downsampling the input image data further comprises at least a 4× resolution reduction from the input image resolution; and
upsampling the image data further comprises at least a 4× resolution increase from the downsampled image resolution.

9. The method of claim 1, further comprising:
retrieving the input image data from a buffer storing at least one of a decoded representation of the image, or a captured image exposed at the input image resolution by a camera module;
converting, prior to scoring the pixels, the input image data from RGB color space to YUV color space; and
storing the blended image data to an electronic memory.

10. The method of claim 9, further comprising outputting the blended image data from the memory to at least one of a display device or an encoder.

11. The method of claim 9, further comprising:
writing a stream of consecutively exposed image data frames from a camera hardware module (CM) to the buffer at a video frame rate; and
performing each of the pixel scoring, image data downsampling, image data upscaling, image data filtering, and image data blending on each consecutively exposed video data frame at least at the video frame rate.

12. A computerized image enhancement system, comprising:
one or more graphics, central, or applications processors, the one or more processors to:
receive input image data representing an image frame at an input image resolution;
downsample the input image data to a representation of the image frame having a reduced resolution, lower than the input image resolution;
filter the downsampled image data;
upsample the filtered downsampled image data back to the input image resolution; and
blend the input image data with the upsampled filtered image data by weighting the input image data relative to the upsampled filtered image data for the individual pixels as a function of a skin tone detection score determined for individual pixels of the input image data; and
an electronic memory coupled to the one or more processors to store a representation of blended image data output from the one or more processors.

13. The system of claim 12, wherein:
the skin tone detection score is proportional to a probability that an individual pixel comprises a skin tone;
the one or more processors are to interpolate between a luma or chroma value of a pixel in the input image data and a luma or chroma value of the corresponding pixel in the filtered image data based on the skin tone detection score for the pixel.

14. The system of claim 13, wherein the one or more processors are to:
bilaterally filter individual pixel values in the downsampled image; and
interpolate between a luma or chroma value of a pixel in the input image data and a luma or chroma value of the corresponding pixel in the filtered image data by determining a weighted sum of the luma or chroma value of the pixel in the input image data and the luma or chroma value of the pixel in the filtered image data, the two luma or chroma values weighted complementarily by the skin tone detection score.

15. The system of claim 12, further comprising:
a camera hardware module (CM) coupled to the one or more processors to generate a stream of input image data representing time consecutive image frames exposed at the input image resolution; and
at least one of:
a display coupled to the memory to present the blended image data; and
an encoder coupled to the memory to encode the blended image data into a compressed representation.

16. The system of claim 15, wherein the one or more processors further comprise fixed function logic circuitry coupled to the applications processor, the fixed function logic circuitry to output at least one of the skin tone detection scores, downsampled image data, filtered downsampled image data, or blended image data.

17. One or more non-transitory computer-readable storage media, with instructions stored thereon, which when executed by a processor, cause the processor to perform a method comprising:
determining a skin tone detection score for individual pixels of input image data representing an image frame at an input image resolution;
downsampling the input image data to a representation of the image frame having a reduced resolution, lower than the input image resolution;
filtering the downsampled image data;
upsampling the filtered downsampled image data back to the input image resolution; and
blending the input image data with the upsampled filtered image data, wherein the blending comprises input image data relative to the upsampled filtered image data for the individual pixels as a function of each pixel skin tone detection score.

18. The media of claim 17, further storing instructions thereon, which when executed by a processor, cause the processor to further perform a method comprising:
   scoring the pixels by determining a skin tone detection score between 0 and 1 that is proportional to a probability the individual pixel comprises a skin tone;
   filtering the downsampled image data by smoothing a pixel value of the downsampled image based on a value of one or more downsampled image pixel neighboring the pixel being smoothed; and
   blending the input image data with the upsampled filtered image data by blending at least one of a luma value or a chroma value of individual pixels in the input image data with the luma or chroma value of corresponding pixels in the upsampled filtered image data.

19. The media of claim 17, further storing instructions thereon, which when executed by a processor, cause the processor to further perform a method comprising:
   blending at least one of a luma value or a chroma value of individual pixels in the input image data with the luma or chroma value of corresponding pixels in the upsampled filtered image data by determining a weighted sum of the luma or chroma value of the pixel in the input image data and the luma or chroma value of the pixel in the filtered image data, the two luma or chroma values weighted complementarily by the skin tone detection score.

20. The media of claim 19, further storing instructions thereon, which when executed by a processor, cause the processor to further perform a method comprising:
   smoothing a pixel value of the downsampled image by performing a bilateral filtering of individual pixel values in the downsampled image.

21. The media of claim 19, further storing instructions thereon, which when executed by a processor, cause the processor to further perform a method comprising:
   retrieving the input image data from a buffer storing at least one of a decoded representation of the image, or a captured image exposed at the input image resolution by a camera module;
   converting, prior to scoring the pixels, the input image data from RGB color space to YUV color space; and
   storing the blended image data to an electronic memory.

22. The media of claim 17, wherein the skin tone detection score is a value between 0 and 1 that is proportional to a probability the individual pixel comprises a skin tone.

23. The media of claim 17, further storing instructions thereon, which when executed by a processor, cause the processor to further perform a method comprising:
   receiving a stream of consecutively exposed image data frames from a camera hardware module (CM) to the buffer at a video frame rate; and
   performing each of the pixel scoring, image data downsampling, image data upscaling, image data filtering, and image data blending on each consecutively exposed video data frame at least at the video frame rate.

* * * * *